United States Patent
Bovyrin et al.

(10) Patent No.: US 10,694,175 B2
(45) Date of Patent: Jun. 23, 2020

(54) REAL-TIME AUTOMATIC VEHICLE CAMERA CALIBRATION

(71) Applicant: Intel Corporation, Santa Clara, CA (US)

(72) Inventors: Alexander Bovyrin, Nizhny Novgorod (RU); Alexander Kozlov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/769,124

(22) PCT Filed: Nov. 11, 2016

(86) PCT No.: PCT/US2016/061467
§ 371 (c)(1),
(2) Date: Apr. 18, 2018

(87) PCT Pub. No.: WO2017/116570
PCT Pub. Date: Jul. 6, 2017

(65) Prior Publication Data
US 2018/0324415 A1    Nov. 8, 2018

Related U.S. Application Data

(60) Provisional application No. 62/271,935, filed on Dec. 28, 2015.

(51) Int. Cl.
| | |
|---|---|
| *H04N 17/00* | (2006.01) |
| *H04N 5/225* | (2006.01) |
| *G06K 9/00* | (2006.01) |
| *G06T 7/80* | (2017.01) |
| *B60R 1/00* | (2006.01) |
| *B60W 30/02* | (2012.01) |

(52) U.S. Cl.
CPC ............. *H04N 17/002* (2013.01); *B60R 1/00* (2013.01); *B60W 30/02* (2013.01);
(Continued)

(58) Field of Classification Search
None
See application file for complete search history.

(56) References Cited

U.S. PATENT DOCUMENTS 9,014,904 B2 * 4/2015 Higgins-Luthman ........................ G06K 9/00825 701/28
2006/0184297 A1 * 8/2006 Higgins-Luthman ........................ B60W 40/04 701/41

(Continued)

FOREIGN PATENT DOCUMENTS

| EP | 2377094 B1 | 6/2014 |
|---|---|---|
| WO | 2012139636 A1 | 10/2012 |

(Continued)

OTHER PUBLICATIONS

PCT search report and written opinion dated Feb. 15, 2017 in corresponding PCT/US/2016/061467 (16 pgs).

(Continued)

*Primary Examiner* — Talha M Nawaz
(74) *Attorney, Agent, or Firm* — Trop, Pruner & Hu, P.C.

(57) ABSTRACT

A camera facing the front of a vehicle while the vehicle is moving on the road may be calibrated by receiving sequential images from the camera. Image key points in the area limited by the road location are selected. The key points are tracked using an optical flow method. A filtering procedure is applied to the key points to identify the straight-line motion of the vehicle. At least two straight lines corresponding to opposite sides of the road. A calibration algorithm is applied to the at least two lines to determine a vanishing point. The pitch and/or yaw angles of the camera are then calculated.

30 Claims, 5 Drawing Sheets

(52) U.S. Cl.
CPC ..... *G06K 9/00798* (2013.01); *G06K 9/00818* (2013.01); *G06T 7/80* (2017.01); *H04N 5/2257* (2013.01); *B60R 2300/402* (2013.01); *G06T 2207/10016* (2013.01); *G06T 2207/30252* (2013.01)

(56) References Cited

U.S. PATENT DOCUMENTS

| | | | |
|---|---|---|---|
| 2009/0290032 A1 | 11/2009 | Zhang et al. | |
| 2010/0079590 A1* | 4/2010 | Kuehnle | G06K 9/00798 348/118 |
| 2011/0115912 A1* | 5/2011 | Kuehnle | G06K 9/00798 348/148 |
| 2016/0203606 A1* | 7/2016 | Arata | G06T 7/80 348/148 |

FOREIGN PATENT DOCUMENTS

| | | |
|---|---|---|
| WO | 2012145818 A1 | 11/2012 |
| WO | 2013169185 A1 | 11/2013 |

OTHER PUBLICATIONS

Chinese Patent Office, First Office Action dated Nov. 14, 2019 in Chinese Application No. 201680065585.2, 10 pages.

\* cited by examiner

REAL-TIME AUTOMATIC VEHICLE CAMERA CALIBRATION

BACKGROUND

This relates to Advanced Driver Assistance Systems (ADAS) and to calibrating a camera facing the front of a vehicle while the vehicle is moving on the road.

Since performance of many different safety features, such as forward collision warning (FCW) and lane departure warning (LDW), depend on correctness of camera parameters, camera calibration is very important for Advanced Driver Assistance Systems (ADAS). While intrinsic camera parameters can be known for camera specifications, extrinsic parameters have to be measured during ADAS system installation. There are many calibration algorithms but most of them are not done in real-time and they require special calibration patterns and complex actions from the user that are not always possible.

BRIEF DESCRIPTION OF THE DRAWINGS

Some embodiments are described with respect to the following figures.

DETAILED DESCRIPTION

Extrinsic camera parameters such as pitch camera angle and yaw camera angle may be estimated in a real-time system on the embedded platform. The roll camera angle is assumed to have near zero value. This is true in most cases. Moreover, some deviation of roll camera angle from zero does not substantially affect other ADAS modules.

Vehicle camera extrinsic parameters are estimated from sequences of images taken from a moving vehicle in real-time on an embedded platform. A tracking algorithm tracks key points on the road and obtains trajectories of key points for vanishing point estimation. The tracking algorithm may be based on optical flow calculation of a small subset of relevant points so the system is able to run in real-time on an embedded system. An optical flow is a pattern of apparent motion of an object caused by relative motion between an observer (i.e. vehicle camera) and the scene (i.e. the road). Optical flow methods calculate motion between two image frames at times t and t+$\Delta$t at every voxel position.

Figure 1:
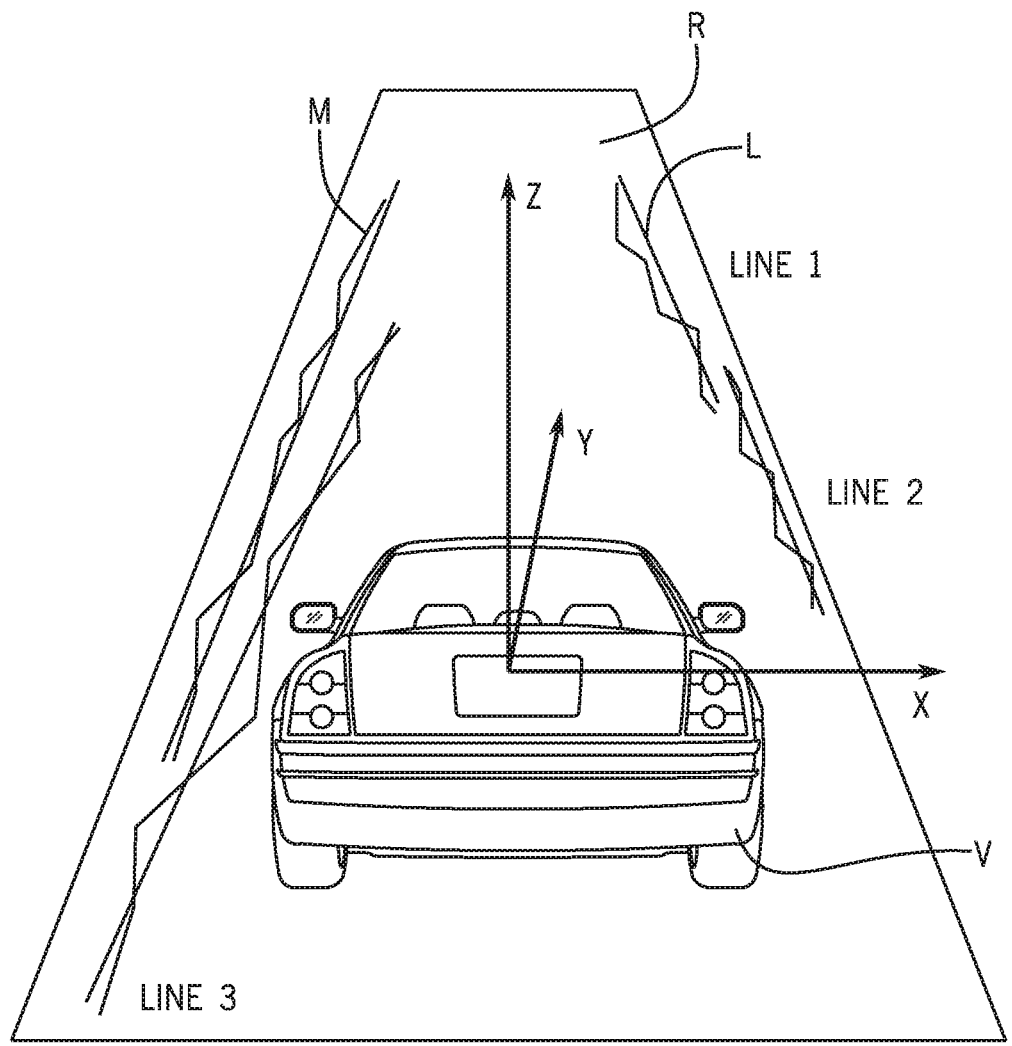
FIG. 1 shows the key points trajectories in three-dimensional space according to one embodiment.

To estimate the vanishing point, key points trajectories are filtered and accumulation of line crosses is performed. This may be done by optimally fitting a line into each key point trajectory and finding intersections of all pairs of these lines. In FIG. 1, vehicle V moves on roadway R. Roadway markings M (jagged lines) based on trajectories of road way marking points may be fit to lines L (i.e., lines Line 1, Line 2, Line 3). These markings may be based on relative motion between the vehicle based key points and lane indicators (not shown) applied to the roadway surface.

The automatic calibration system may operate with sequential images from a vehicle video camera and may work fully automatically in some embodiments. This means that the system can make decisions about starting calibration or finalizing calibration or it can notify the user that calibration is required or that a current calibration process is finished.

The following discussion is common for an automatic calibration module and calibration check module and it describes an approach based on using optical flow to obtain straight road lines for vanishing point estimation. When the calibration process is enabled, the system finds image key points on the roadway for further tracking, for example using a conventional algorithm. (See e.g. J. Shi, et al., "Good features to track", Computer Vision and Pattern Recognition, 1994. Proceedings CVPR '94, 1994 IEEE Computer Society Conference on IEEE, 1994). Key points are considered in an area limited by the approximate road location. This may reduce key points calculation time and enable irrelevant key points to be filtered out. After key points are found, they are tracked, for example, using Lucas-Kanade optical flow method. (See e.g. Jean-Yves Bouguet, "Pyramidal implementation of the Lucas-Kanade feature tracker," Microsoft Research Labs, Tech. Rep. (1999)). Other differential methods include Horn-Schunck, Buxton-Buxton, and Block-Jepson methods. Also non-differential methods may also be used.

When tracking is finished, a filtering procedure is applied to all key points based on the premise that a direction of a vector constructed from a tracking point and its initial position should correspond to straight-line motion of the vehicle. Also, the key point location should be in the road area. After that each key point trajectory Ti (see jagged lines M in FIG. 1) is updated by a new position. Then line Li (see Lines L in FIG. 1) is fit into each key points trajectory Ti. The trajectory Ti is not considered if it does not fit line Li well. The line Li is excluded from further analysis if key points deviation across the line Li exceeds some threshold T. These filtering procedures are useful for a real time algorithm since the outliers may be dropped, thereby reducing calculation time and increasing calibration quality.

Figure 2:
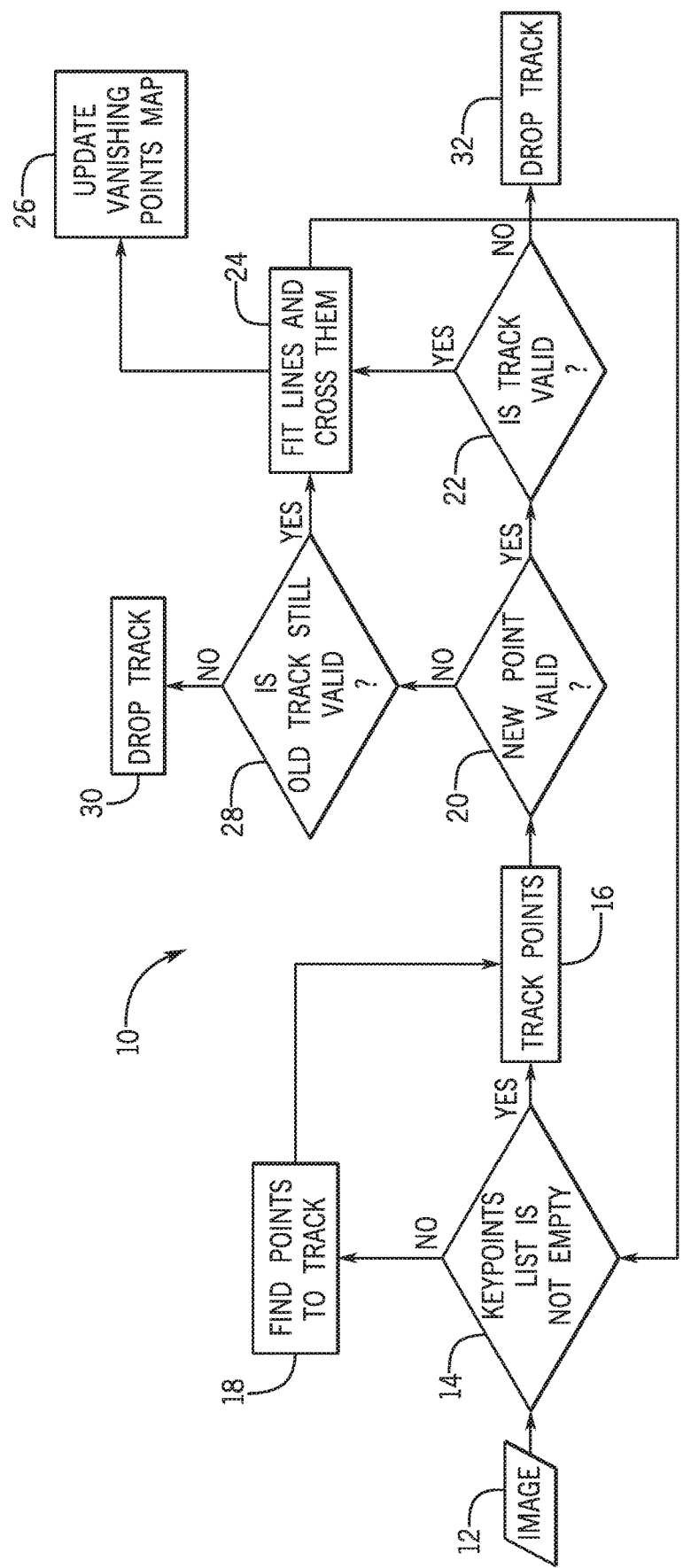
FIG. 2 schematically shows the structure of a vehicle camera calibration algorithm according to one embodiment.

The calibration algorithm (see FIG. 2) crosses all lines Li (constructed as described above) and accumulates results of crossing in a special map M whose size is the same as the input image size. The result of the crossing of two lines Line1 and Line2 (FIG. 1) is point P. The value (length(trajectory1)+length(trajectory2))/2 is added into point P in the map M, where length(trajectory1), is a length of key point trajectory corresponding to Line1. Over time, the map values grow. The calibration process is finalized when a maximum value of map M is greater than a defined threshold Tm. A vanishing point VP is a point corresponding to maximal value of map M.

In FIG. 1, the road is straight so lines such as Lines1 and 2 do not cross. The point where the lines cross in a curved path is called the vanishing point.

The sequence 10 for calibrating a vehicle camera may be implemented in software, firmware and/or hardware. In software and firmware embodiments, it may be implemented by computer executed instructions stored in one or more non-transitory computer readable media such as magnetic, optical or semiconductor storage.

The sequence 10 begins by taking an image 12 and determining whether a key points list (e.g. a list of trackable roadway markings) is not empty at diamond 14.

If the key points list is not empty, then the key points are tracked as indicated at 16. Otherwise a search continues to find points to track as indicated in block 18.

A check at diamond 20 determines whether each new point is valid (i.e., within the roadway). If so, a check at diamond 22 determines whether the track is valid (i.e., does the track correspond to the straight-line motion of the vehicle). If so, the lines are fit and they are crossed at block 24. If the track is not valid as determined in diamond 26, the track is dropped at block 32.

If the new point is not valid as determined in diamond 20, a check at diamond 28 determines whether the old track is still valid. If not, the track is dropped as indicated at 30. Otherwise the flow continues to block 24 and lines are fit to the data (e.g. markings M in FIG. 1) and line crossings are detected. Finally, the vanishing points map is updated as indicated in block 26.

Since the vanishing point is known, pitch and yaw angles of the camera extrinsic parameters can be calculated as follows:

$$\text{pitch} = \text{arc} tg\left(\frac{-V_p + c_y}{f_y}\right) \quad (1)$$

$$\text{yaw} = \text{arc} tg\left(\frac{(U_p - c_x) * \cos(\text{pitch})}{f_x}\right),$$

where $(U_p, V_p)$ are image coordinates of a vanishing point, and $f_x$, $f_y$ and $(c_x, c_y)$ are focal lengths and coordinates respectively of the principal point of the camera. The principal point is where the optical axis crosses the camera plane.

Figure 3:
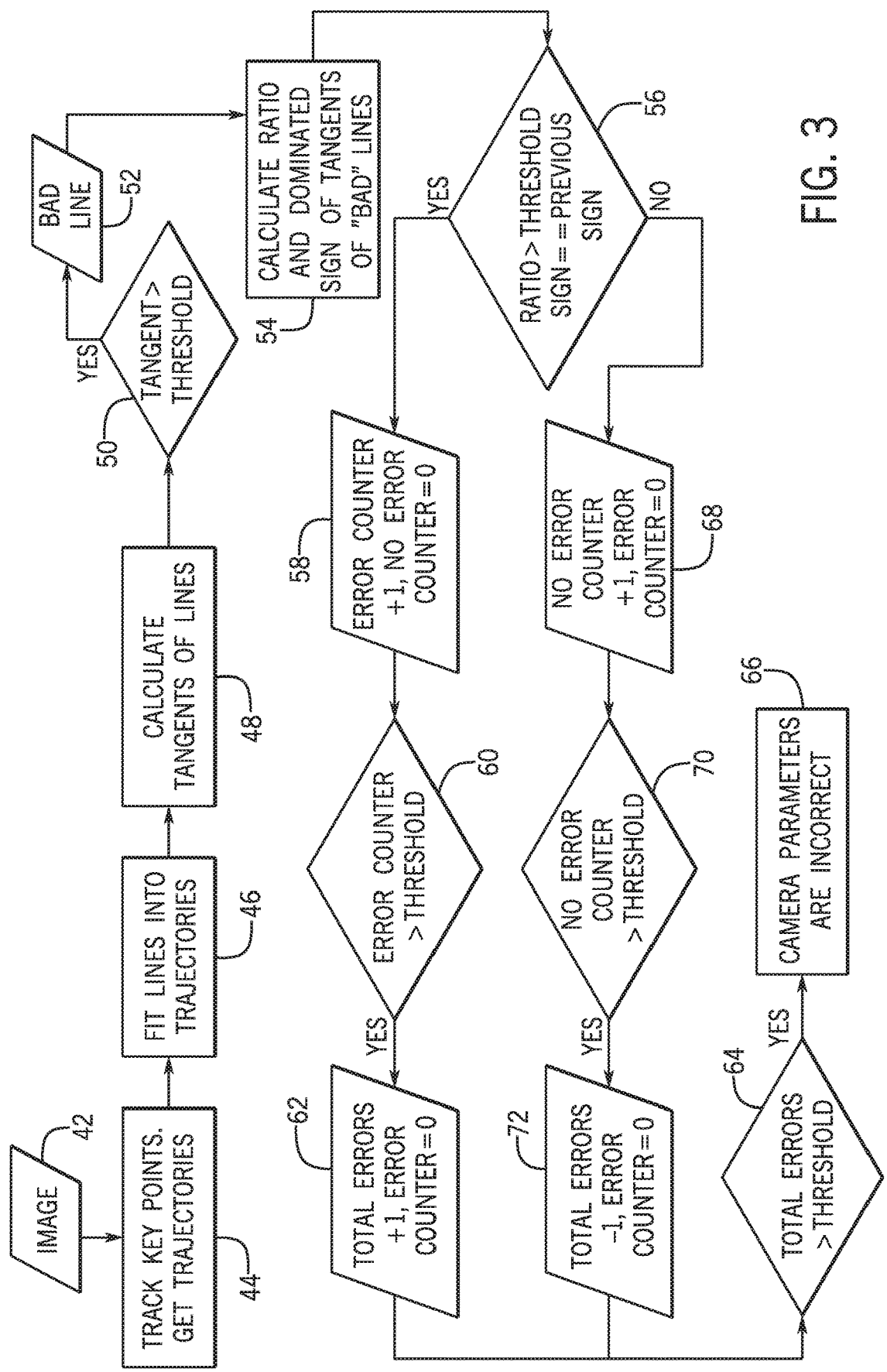
FIG. 3 schematically shows the calibration check algorithm according to one embodiment.

The calibration check 40, shown in FIG. 3, uses the same algorithm to fit lines into key points trajectories, but it uses them in a different manner. First of all, it finds a representation of each line in three-dimensional space. The main idea is that the prototype of the line in the vehicle coordinate system should be parallel to the vehicle's direction of motion or the Z axis, as shown in FIG. 1.

The sequence 40 shown in FIG. 3 may be implemented in software, firmware and/or hardware. In software and firmware embodiments, the sequence may be implemented by computer executed instructions stored in one or more non-transitory computer readable media such as magnetic, optical or semiconductor storage.

The sequence 40 begins by receiving an image 42. At block 44 key points are tracked and their trajectories are obtained. Key points can be found by any corner point detection method, for instance, FAST corners detector or HARRIS corners detector. Then lines are fit into the trajectories as indicated in block 46. Next the tangents of the trajectory lines are calculated at block 48.

A check at diamond 50 determines whether the tangent is greater than a threshold. A line is skipped if the tangent is less than a threshold. Particular threshold values may be selected based on test data. If the tangent is greater than a threshold, a bad line is indicated at 52 and the ratio R of the number of bad lines to a number of found lines in a current round is calculated as indicated at block 54.

Camera parameters are checked only if vehicle motion is stable and vehicle motion direction was not changed during the last two frames. To check this motion stability, a tangent sign is found that corresponds to a majority of tangent signs ("dominated sign"). This sign is compared to the sign in the previous frame. If they are same, then it is decided that vehicle moves in same direction and so the camera check process is still valid.

Then, in diamond 56, a check determines if the ratio R is greater than a threshold and whether the tangent's corresponds to majority of previous tangents' sign. The ratio threshold value may be selected empirically based on test data. If so, the error counter is incremented by one and the no error counter is set to zero as indicated in block 58.

Then a check at diamond 60 determines whether the error counter is greater than a threshold. If so, the total errors are incremented by one and the error counter is set to zero as indicated in block 62. If "error counter" is less than a threshold then the "total error" counter, that corresponds to number of instances where incorrect camera parameters were observed, is not increased.

Next a check at diamond 64 determines whether the total errors exceed a threshold. If so, the camera parameters are incorrect as determined in block 66. If "total errors" number is less than threshold, continue checking parameters since parameters incorrectness was not observed over enough time (not enough number of frames with incorrect camera parameters to make decision).

If the ratio R is not greater than the threshold and the sign is not substantially equal to the previous sign, as determined in diamond 56, the no error counter is incremented by one and the error counter is set to zero at block 68. Then a check at diamond 70 determines whether the no error counter is greater than a threshold. If so, the total number of errors are decreased by one and no_error_counter is set equal to zero in block 72 and the flow continues at diamond 64. "No error counter" corresponds to the number of consecutive frames where the decision was that camera parameters are correct. If "no error counter" is big enough, the global variable "Total errors" is reduced which corresponds to how many instances of incorrect camera parameters were found.

Using this fact, the following action is performed to obtain tangents of the line with respect to the Z axis:
  firstly, fast perspective removal procedure is performed to get the line prototype in the vehicle coordinate system; and
  then tangent values are calculated for orthogonal projection of the line prototypes to the OXZ plane.

In a fast perspective removal procedure (FPR), $p_w$, a point in vehicle coordinate system, and $p_i$, its perspective projection to the image plane, are bound by the following expression: $p_i = M p_w$, where M is the camera matrix (A*[R|t]).

Given line parameters $L = [ABC]^t$, the line equation is:

$$[ABC]^{t*}[xy1] = 0$$

Let $L_i$ be an image line (in an image coordinate system) and $L_w$ be a road line in world coordinates.
The perspective removal can be done according to the following expression (2):

$$L_i^t p_i = 0, \text{ then } L_i^t M p_w = 0 \rightarrow L_w^t = L_i^t M$$

$$p_i = M p_w \quad (2)$$

Once the FPR is done, the tangents of the lines can be calculated by computing the tangent of the angle between the road line projection into the world coordinate system $C_w$ and the optical axis of the camera in the world coordinate system, $A_w$:

$$\text{tangent}(L_w) = C_w / A_w \quad (3)$$

After that tangents are checked using the criteria already described.

The calibration check algorithm is divided into rounds and a new round starts every 10 seconds in one embodiment. This approach allows detection of any substantial parameters deviation and it does not affect performance of other ADAS modules. In each check, do the following:
  Straight lines are obtained as described above and tangents of these lines are calculated using M. Miksch, et al., "Automatic extrinsic camera self-calibration based on homography and epipolar geometry (2010).

Tangents values are checked against threshold T1. If a tangent value exceeds threshold T1, this is defined as "bad."

Then compute the following ratio: R=("bad" lines number)/(number of found lines in current round).

If this ratio R is greater than 0.5, the current error counter Ce is incremented, the current "no error" counter Cne is decremented to zero (Cne=0). Also, the signs of slopes of dominated "bad" lines is taken into account. If the sign on the previous round is not equal to the sign on the current round, then the current error counter Ce is set to 1 (Ce=1).

Otherwise if the ratio R is less or equal to 0.5, the current "no error" counter Cne is incremented and the current error Ce is decremented to zero (Ce=0).

If during the regular round, the current error counter Ce exceeds a threshold T2 then the total error counter TCe is incremented and the current error counter is set to zero (Ce=0). If the current "no error" counter Cne exceeds the threshold T3, then the total error counter Tce is decremented.

Camera parameters are defined as incorrect if total error counter TCe reaches its own threshold T4. If TCe<T4, current camera parameters are considered as valid.

When the calibration check system defines that parameters are wrong, it can notify user that ADAS modules are not ready to use and camera should be calibrated. Or it can automatically run the camera calibration procedure described above.

Figure 4:
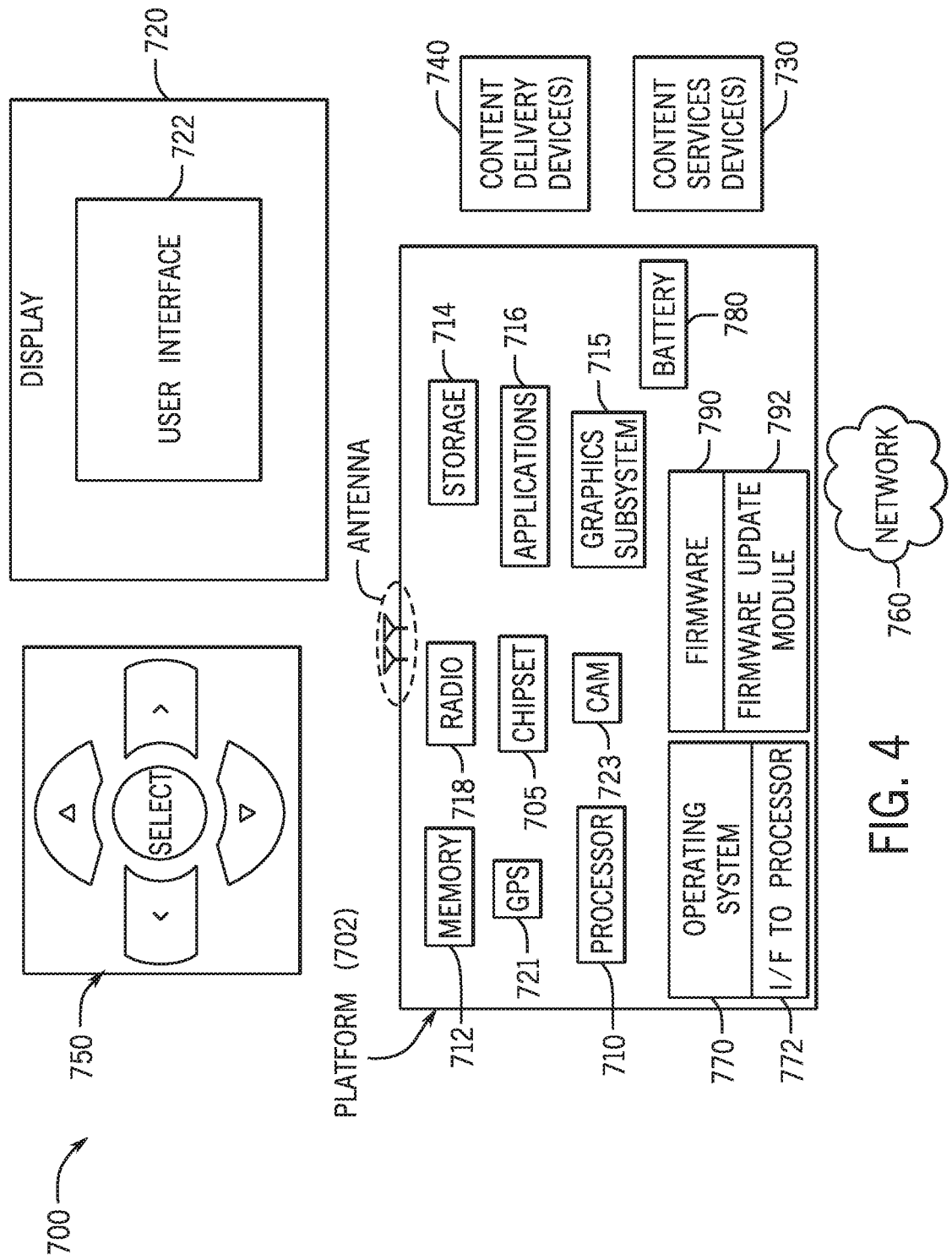
FIG. 4 is a system depiction for one embodiment.

FIG. 4 illustrates an embodiment of a system 700. In embodiments, system 700 may be a transmitter although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 2 and 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
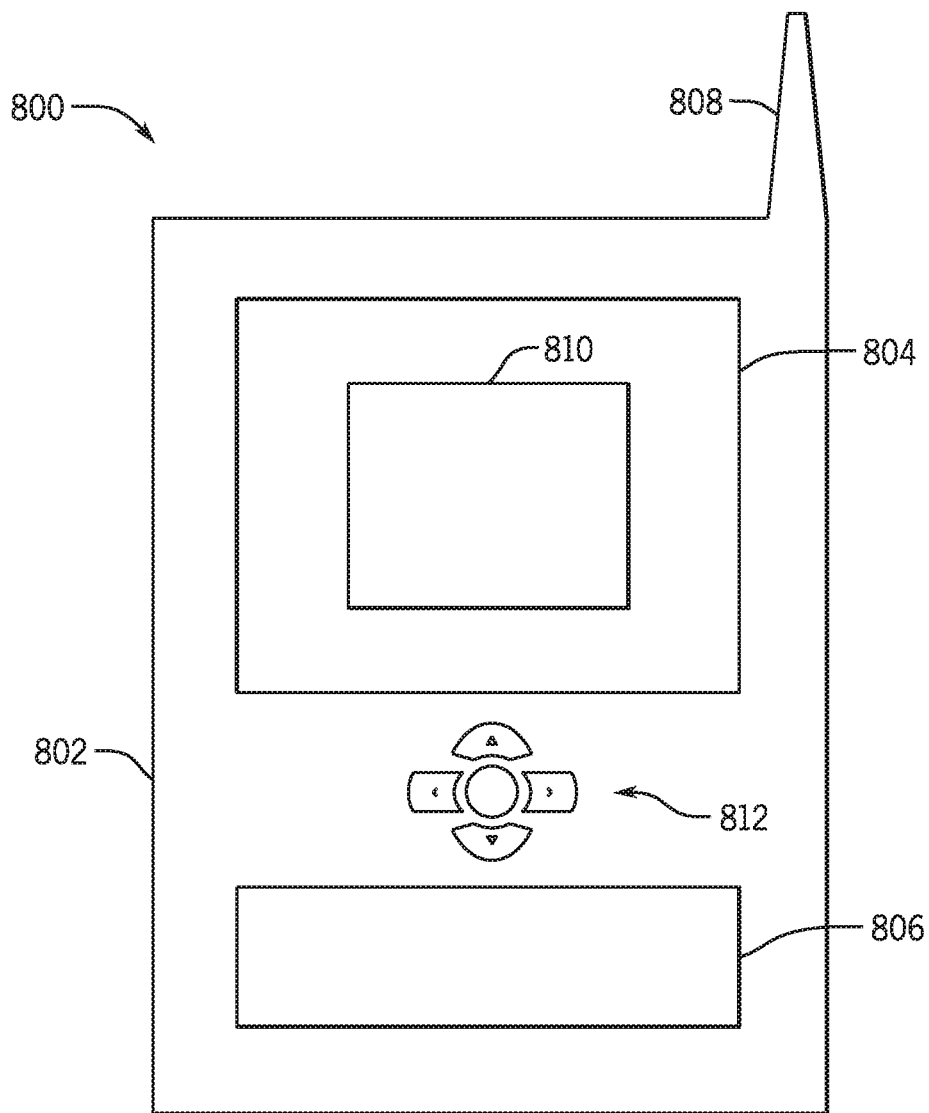
FIG. 5 is front elevation of a system according to one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 5, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method of calibrating a camera facing the front of a vehicle while the vehicle is moving on the road, comprising receiving sequential images from the camera, finding image key points in an area limited by a location of the road, tracking the key points using an optical flow method, applying a filtering procedure to the key points to identify the straight-line motion of the vehicle and at least two straight lines corresponding to opposite sides of the road, applying a calibration algorithm to the at least two lines to determine a vanishing point, and calculating pitch or yaw angles of the camera. The method may also include determining whether the pitch or yaw angles of the camera are within a predetermined acceptable threshold. The method may also include fitting straight lines to trajectories of road markings. The method may also include identifying a location where said straight lines cross. The method may also include determining vehicle motion stability. The method may also include determining whether tangents are below a threshold to determine vehicle motion stability. The method may also include comparing a tangent sign to a majority of tangent signs. The method may also include calculating a ratio of lines not found to lines found. The method may also include determining if the ratio exceeds a threshold. The method may also include if the threshold is exceeded, incrementing an error count. The method may also include if an error count reaches a threshold determining that proposed camera parameters are incorrect.

Another example embodiment may be one or more non-transitory computer readable media storing instructions to perform a sequence comprising receiving sequential images from the camera, finding image key points in an area limited by a location of the road, tracking the key points using an optical flow method, applying a filtering procedure to the key points to identify the straight-line motion of the vehicle and at least two straight lines corresponding to opposite sides of the road, applying a calibration algorithm to the at least two lines to determine a vanishing point, and calculating pitch or yaw angles of the camera. The medium may also include further storing instructions to perform a sequence including determining whether the pitch or yaw angles of the camera are within a predetermined acceptable threshold. The medium may also include further storing instructions to perform a sequence including fitting straight lines to trajectories of road markings. The medium may also include further storing instructions to perform a sequence including identifying a location where said straight lines cross. The medium may also include further storing instructions to perform a sequence including determining vehicle motion stability. The medium may also include further storing instructions to perform a sequence including determining whether tangents are below a threshold to determine vehicle motion stability. The medium may also include further storing instructions to perform a sequence including comparing a tangent sign to a majority of tangent signs. The method may also include further storing instructions to perform a sequence including calculating a ratio of lines not found to lines found. The method may also include further storing instructions to perform a sequence including determining if the ratio exceeds a threshold. The method may also include further storing instructions to perform a sequence including if the threshold is exceeded, incrementing an error count. The method may also include further storing instructions to perform a sequence including if an error count reaches a threshold determining that proposed camera parameters are incorrect.

In another example embodiment may be an apparatus comprising a processor to receive sequential images from the camera, to find image key points in an area limited by a location of the road, to track the key points using an optical flow method, to apply filtering procedure to the key points to identify the straight-line motion of the vehicle and at least two straight lines corresponding to opposite sides of the road, to apply a calibration algorithm to the at least two lines to determine a vanishing point, and to calculate pitch or yaw angles of the camera, and a memory coupled to said processor. The apparatus may include said processor to determine whether the pitch or yaw angles of the camera are within a predetermined acceptable threshold. The apparatus may include said processor to fit straight lines to trajectories of road markings. The apparatus may include said processor to identify a location where said straight lines cross. The apparatus may include said processor to determine vehicle motion stability. The apparatus may include said processor to determine whether tangents are below a threshold to determine vehicle motion stability. The apparatus may include said processor to compare a tangent sign to a majority of tangent signs. The apparatus may include said processor to calculate a ratio of lines not found to lines found.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method of calibrating a camera facing the front of a vehicle while the vehicle is moving on the road, comprising:
   receiving sequential images from the camera;
   finding a plurality of key points in an image area limited by a location of the road;
   tracking the plurality of key points using an optical flow method;
   determining a plurality of lines based on trajectories of the plurality of key points;
   finding a plurality of intersections for pairs of lines of the plurality of lines;
   determining a plurality of map values based on lengths of the lines associated with the plurality of intersections;
   determining a vanishing point using the plurality of map values; and calculating pitch or yaw angles of the camera based on the vanishing point determined using the plurality of map values.

2. The method of claim 1 including determining whether the pitch or yaw angles of the camera are within a predetermined acceptable threshold.

3. The method of claim 1 including fitting the plurality of lines to the trajectories of the plurality of key points.

4. The method of claim 1, wherein determining the vanishing point comprises determining that a maximum map value exceeds a first threshold for calibration.

5. The method of claim 1, wherein determining each map value comprises averaging line lengths for a pair of lines.

6. The method of claim 1 including determining whether tangents of the plurality of lines are below a second threshold to determine vehicle motion stability.

7. The method of claim 6 including comparing a tangent sign to a majority of tangent signs.

8. The method of claim 7 including calculating a ratio of lines not found to lines found.

9. The method of claim 8 including determining if the ratio exceeds the second threshold.

10. The method of claim 9 including, in response to a determination that the second threshold is exceeded, incrementing an error count.

11. The method of claim 10 including, in response to a determination that the error count has reached the second threshold, determining that proposed camera parameters are incorrect.

12. One or more non-transitory computer readable media storing instructions to perform a sequence comprising:
   receiving sequential images from the camera;
   finding a plurality of key points in an image area limited by a location of the road;
   tracking the plurality of key points using an optical flow method;
   determining a plurality of lines based on trajectories of the plurality of key points;
   finding a plurality of intersections for pairs of lines of the plurality of lines;
   determining a plurality of map values based on lengths of the lines associated with the plurality of intersections;
   determining a vanishing point using the plurality of map values; and
   calculating pitch or yaw angles of the camera based on the vanishing point determined using the plurality of map values.

13. The medium of claim 12, further storing instructions to perform a sequence including determining whether the pitch or yaw angles of the camera are within a predetermined acceptable threshold.

14. The medium of claim 12, further storing instructions to perform a sequence including the plurality of lines to the trajectories of the plurality of key points.

15. The medium of claim 12, wherein determining the vanishing point comprises determining that a maximum map value exceeds a first threshold for calibration.

16. The medium of claim 12, wherein determining each map value comprises averaging line lengths for a pair of lines.

17. The medium of claim 12, further storing instructions to perform a sequence including determining whether tangents of the plurality of lines are below a second threshold to determine vehicle motion stability.

18. The medium of claim 17, further storing instructions to perform a sequence including comparing a tangent sign to a majority of tangent signs.

19. The medium of claim 18, further storing instructions to perform a sequence including calculating a ratio of lines not found to lines found.

20. The medium of claim 19, further storing instructions to perform a sequence including determining if the ratio exceeds the second threshold.

21. The medium of claim 20, further storing instructions to perform a sequence including, in response to a determination that the second threshold is exceeded, incrementing an error count.

22. The medium of claim 21, further storing instructions to perform a sequence including, in response to a determination that the error count has reached the second threshold determining that proposed camera parameters are incorrect.

23. An apparatus comprising:
   a processor to:
      receive sequential images from a camera of a vehicle,
      find a plurality of key points in an image area limited by a location of a road,
      track the plurality of key points using an optical flow method,
      determine a plurality of lines based on trajectories of the plurality of key points,
      find a plurality of intersections for pairs of lines of the plurality of lines,
      determine a plurality of map values based on lengths of the lines associated with the plurality of intersections,
      determine a vanishing point using the plurality of map values, and
      calculate pitch or yaw angles of the camera based on the vanishing point determined using the plurality of map values; and
   a memory coupled to said processor.

24. The apparatus of claim 23, said processor to determine whether the pitch or yaw angles of the camera are within a predetermined acceptable threshold.

25. The apparatus of claim 23, said processor to fit the plurality of lines to the trajectories of the plurality of key points.

26. The apparatus of claim 23, said processor to determine the vanishing point based on a determination that a maximum map value exceeds a first threshold for calibration.

27. The apparatus of claim 23, said processor to determine each map value by averaging line lengths for a pair of lines.

28. The apparatus of claim 27, said processor to determine whether tangents of the plurality of lines are below a second threshold to determine vehicle motion stability.

29. The apparatus of claim 28, said processor to compare a tangent sign to a majority of tangent signs.

30. The apparatus of claim 28, said processor to calculate a ratio of lines not found to lines found.

* * * * *